Oct. 20, 1959  J. W. ERICKSON  2,909,682
SELF-CLEANING VENTILATING SYSTEM FOR DYNAMOELECTRIC MACHINES
Filed Dec. 27, 1957
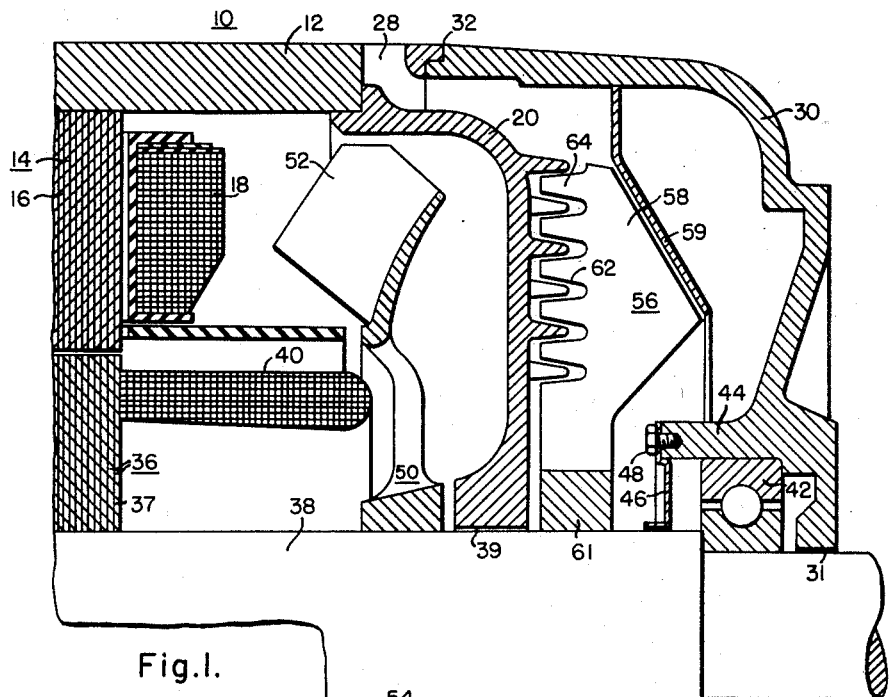
Fig.1.
Fig.2.
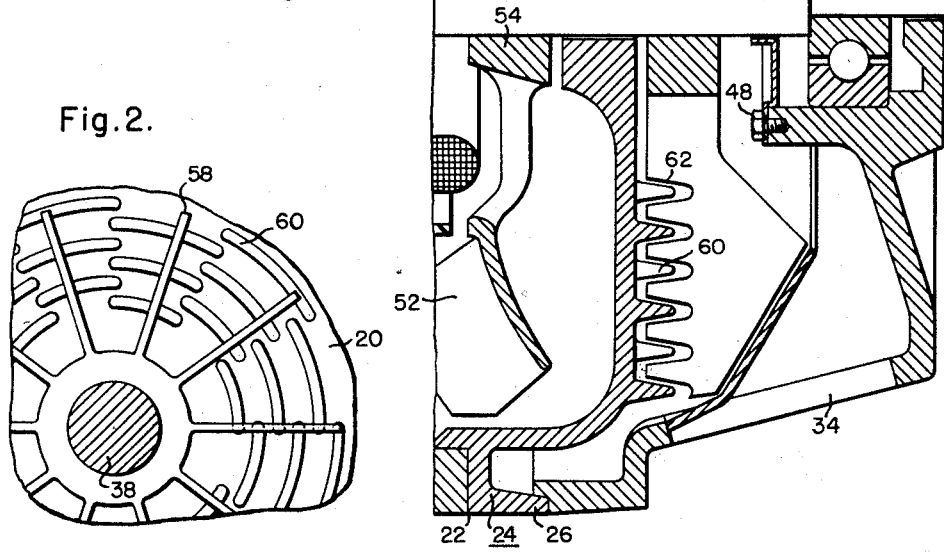
WITNESSES
INVENTOR
John W. Erickson
BY
ATTORNEY United States Patent Office 2,909,682
Patented Oct. 20, 1959

2,909,682

SELF-CLEANING VENTILATING SYSTEM FOR DYNAMOELECTRIC MACHINES

John W. Erickson, East Aurora, N.Y., assignor to Westinghouse Electric Corporation, East Pittsburgh, Pa., a corporation of Pennsylvania Application December 27, 1957, Serial No. 705,582

10 Claims. (Cl. 310—64)

The present invention relates to a ventilating system for dynamoelectric machines, and more particularly, to a self-cleaning ventilating system for a totally enclosed dynamoelectric machine.

Dynamoelectric machines, when in operation, generate heat which may cause damage to the machine by overheating the insulation on the windings. The heating of an electric motor during use largely determines the capacity of that motor. The temperature rise may be considerably reduced by providing cooling means for a motor, and in this manner a physically small motor may be designed to perform the duty of a much larger motor. Thus, it is of very great importance that the temperature rise occurring during the operation of a motor or any dynamoelectric machine be limited as much as possible.

Different systems have been used, whereby the cooling effect has been produced by means of utilizing cool external air. One method of cooling a dynamoelectric machine is simply to direct a stream of air through it by means of a fan secured to the rotating shaft. However, the conditions under which motors are often installed require that they be totally enclosed to prevent the admission of dirt, dust, lint and other undesired matter. Such enclosures complicate considerably the problem of cooling. To overcome this heating problem in a totally enclosed motor, it is customary to provide an internal fan for circulating internal air in the interior of the machine and an external fan for circulating the external air over the heat transferring surfaces of the machine. In order to more readily dissipate the heat generated, some of the machines have heat radiating fins about the outer surfaces of the machines. The totally enclosed motors are often used in applications where the air is laden with dust, dirt, lint or other foreign particles. Any corners, projections or other irregularities offer points of attachment for these foreign particles. When particles have once lodged at such points, additional foreign particles carried toward the machine by the ventilating air will be caught so that a considerable accumulation of foreign material will build up at these points. Heat radiating fins are ideal irregularities on which these undesired particles can accumulate. This condition is highly undesirable because accumulation of foreign material between the heat radiating fins of the machine may prevent or impede the transfer of heat from the machine to the cooling air.

It is therefore an object of the present invention to provide an improved ventilating system for a dynamoelectric machine.

Another object of this invention is to provide an improved ventilating system for a totally enclosed dynamoelectric machine.

A further object of this invention is to provide an improved ventilating system for a totally enclosed dynamoelectric machine with an increased and more efficient heat transfer surface.

A still further and more specific object of this invention is to provide an improved ventilating system for a dynamoelectric machine having an increased and more efficient heat transfer surface provided with means for removing accumulations of foreign material from the extended heat transfer surface.

Other objects and advantages of the invention will be apparent from the following detailed description, taken in connection with the accompanying drawings, in which:

Figure 1 is a longitudinal view of one end of a dynamoelectric machine embodying this invention, partly in section; and Fig. 2 is a partial and elevational view showing a fan and end bracket of this invention.

Referring now to Fig. 1, the invention is shown embodied in a dynamoelectric machine 10 having a generally cylindrical stationary frame 12 which surrounds and supports a stator member 14 including a plurality of laminations 16 of magnetic material adapted to be excited by a winding 18. The stationary frame 12 is closed at one end by an end bracket 20 and at its other end by a similar end bracket not shown. The end brackets 20 may be secured to the frame in any suitable manner as by a rabbet fit as shown at 22. An L-shaped peripheral ring 24 is formed integral with end bracket 20 having one leg 26 extending outwardly toward the end of the machine. Portions of ring 24 are cut away to provide radial ventilating openings as at 28 to serve as exhaust ports for the cooling air. A fan cover or protector 30 is secured to ring 24 of end bracket 20 by any suitable means as by a rabbet fit as shown at 32. The fan cover 30 has a large opening 34 to admit exterior air.

The rotor comprises the core structure 36 including a plurality of laminations 37 of magnetic material mounted on the shaft 38 carrying windings 40. The shaft 38 extends through central opening 39 in end bracket 20 and is journaled in the bearing 42 carried by the fan cover or protector 30. The bearing 42 may be of any suitable type, as for example a ball bearing, as shown. The shaft may, if desired, be extended to pass through central opening 31 in cover 30. The end bracket 20 is secured to the stator frame 12 in any suitable manner to make a tight joint therewith. The fan cover 30 has a central bearing bracket 44 in which is mounted the bearing 42. A rear bearing cap 46 encloses the bearing 42 and is secured to the bearing bracket 44 in any suitable manner, as for example by screws 48.

In order to provide for ventilating the machine thus far described, a fan 50 is provided having blades 52 and a hub portion 54 mounted on shaft 38 for rotation therewith. The fan 50 circulates internal air in the interior of the motor. An external fan 56 having blades 58 and a hub portion 61 mounted on shaft 38 for rotation therewith is provided for circulating external air over the heat transferring surfaces of the machine. The fan 50 is mounted on the shaft 38 intermediate the end turns of coil 40 and the end bracket 20. Fan 56 is mounted on the shaft 38 in the space between fan cover 30 and end bracket 20. The cover 30 provides protection from contact with the rotating fan blades 58. An annular baffle member 59 is secured to the inner surface of cover 30 and serves as a guide between incoming and outgoing air. On the surface of end bracket 20, adjacent fan 56, are a plurality of heat radiating fins 60. Fins 60 extend outwardly from the surface of end bracket 20. Blades 58 of fan 56 lie closely adjacent the outer surface of end bracket 20 and overlap fins 60. However, fan blades 58 are provided with a plurality of notches 62 which mesh with fins 60. The arrangement of heat radiating fins 60 can best be seen in Fig. 2.

As shown in Fig. 2, the fins 60 are arcuate shaped segments of circles concentric with shaft 38. The fins 60 may be positioned in circumferentially arranged rows and radially aligned columns. Fins of alternate rows may be displaced from the fins of the next adjacent row so that the interstices between fins of one row are filled by fins of the next adjacent row. The notches 62 on each fan blade 58 are spaced radially so as to coincide with the circles upon which fins 60 lie. They are slightly wider than fins 60 and slightly deeper so as to closely surround the fins. This arrangement enables the fan blades to be positioned closely adjacent the outer face of the end bracket and fins, thus, insuring the maximum rate of transfer of heat from the end bracket 20. In addition, the arrangement of the fins on the end bracket 20 causes the exterior air to spiral thereabout, thereby creating a higher rate of heat transfer.

Another advantageous characteristic of the present arrangement of fan 56 and fins 60 is the self-cleaning feature. Heat radiating fins provide surfaces and corners for accumulation of lint, dirt and dust. Because of the manner in which the serrations 64 on the blade 58 which are formed by notches 62 engage the slots between the fins 60, any accumulation of foreign particles will be wiped away by the serrations 64 and consequently blown away by the blast of air from the fan 56. The slight accumulation remaining in the clearance space between serrations 64 and the fins can be easily carried away by the air stream. If such an accumulation of foreign particles were permitted to remain, they would form a heat insulating layer which would result in over heating of the machine.

In operation fans 50 and 56 rotate with the shaft 38. The blades 52 of fan 50 will produce an internal air stream which is drawn through the machine and will deflect the air against the end bracket 20. The end bracket 20 and fins 60 absorb most of the heat from the internally circulated air and transfer most of the heat to the air surrounding the outer surface of the end bracket 20 by radiation. This heat is rapidly carried from the end bracket 20 by outer fan 56 which is arranged to draw a large volume of exterior air through opening 34 and fan protector or cover 30 and then force the same radially outward through ventilating passages or openings 28, after the external air has been spiraled about fin 60. At the same time, any dust or other foreign particles which are drawn in through passage 34 and tend to accumulate on fin 60 are wiped away by serrations 64 on fan blades 58.

It will now be apparent that a new type of ventilating system for a dynamoelectric machine particularly of the totally enclosed type has been described which is self-cleaning and which provides an improved rate of heat transfer from the machine. The new self-cleaning ventilating system utilizes concentric radiating fins on the end bracket and inter-related notches on the outer fan blades to permit greater compactness in addition to achieving improved heat transfer characteristics in the above-described self-cleaning feature.

A specific embodiment of the invention has been shown and described for the purpose of illustration, but it will be understood that various other embodiments and modifications are possible and are within the scope of the invention.

I claim as my invention:

1. In a fan cooled dynamoelectric machine; a self-cleaning ventilating system comprising an end bracket having a central opening, a rotatable shaft extending through said central opening, a fan having a plurality of blades secured to said shaft exteriorly of said end bracket and rotatable with said saft, each of said blades having an edge lying in close proximity to the exterior surface of said end bracket, a plurality of heat radiating fins on the exterior surface of said end bracket, and means on said blades for removing accumulations of foreign particles from said fins and the spaces between the fins.

2. In a fan cooled dynamoelectric machine; a self-cleaning ventilating system comprising an end bracket having a central opening, a rotatable shaft extending through said central opening, a fan having a plurality of blades secured to said shaft exteriorly of said end bracket and rotatable with said shaft, each of said blades having an edge lying in close proximity to the exterior surface of said end bracket, a plurality of heat radiating fins on the exterior surface of said end bracket, said fins projecting outwardly beyond the adjacent edges of said fan blade, each of said fins being an arc of a circle concentric with said shaft, and notches on the edge of said blade adjacent said fins positioned to receive said fins when said fan is rotating.

3. In a fan cooled dynamoelectric machine; a self-cleaning ventilating system comprising an end bracket having a central opening, a rotatable shaft extending through said central opening, a fan having a plurality of blades secured to said shaft exteriorly of said end bracket and rotatable with said shaft, each of said blades having an edge lying in close proximity to the exterior surface of said end bracket, a plurality of heat radiating fins on the exterior surface of said end bracket, said fins projecting outwardly beyond the adjacent edges of said fan blades, each of said fins being an arc of a circle concentric with said shaft, said fins being circumferentially spaced from each other, and notches on the edges of said blades adjacent said fins positioned to receive said fins when said fan is rotating.

4. In a fan cooled dynamoelectric machine; a self-cleaning ventilating system comprising an end bracket having a central opening, a rotatable shaft extending through said central opening, a fan having a plurality of blades secured to said shaft exteriorly of said end bracket and rotatable with said shaft, each of said blades having an edge lying in close proximity to the exterior surface of said end bracket, a plurality of heat radiating fins on the exterior surface of said end bracket, said fins projecting outwardly beyond the adjacent edge of said fan, each of said fins being an arc of a circle concentric with said shaft, said fins being radially spaced from each other, and notches on the edge of said fan adjacent said fins positioned to receive said fins when said fan is rotating.

5. In a fan cooled dynamoelectric machine; a self-cleaning ventilating system comprising an end bracket having a central opening, a rotatable shaft extending through said central opening, a fan having a plurality of blades secured to said shaft exteriorly of said end bracket and rotatable with said shaft, each of said blades having an edge lying in close proximity to the exterior surface of said end bracket, a plurality of heat radiating fins on the exterior surface of said end bracket, said fins projecting outwardly beyond the adjacent edges of said fan blades, each of said fins being an arc of a circle concentric with said shaft, said fins being radially and circumferentially spaced from each other, and notches on the edges of said blades adjacent said fins positioned to receive said fins when said fan is rotating.

6. In a fan cooled dynamoelectric machine; a self-cleaning ventilating system comprising an end bracket having a central opening, a rotatable shaft extending through said central opening, a fan having a plurality of blades secured to said shaft exteriorly of said end bracket and rotatable with said shaft, each of said blades having an edge lying in close proximity to the exterior surface of said end bracket, a plurality of heat radiating fins on the exterior surface of said end bracket, said fins projecting outwardly beyond the adjacent edges of said fan blades, each of said fins being an arc of a circle concentric with said shaft, said fins being arranged in circumferentially aligned rows, said rows being radially spaced from each other, and notches on the edges of said blades adjacent said fins positioned to receive said fins when said fan is rotating.

7. In a fan cooled dynamoelectric machine; a self-cleaning ventilating system comprising an end bracket having a central opening, a rotatable shaft extending through said central opening, a fan having a plurality of blades secured to said shaft exteriorly of said end bracket and rotatable with said shaft, each of said blades having an edge lying in close proximity to the exterior surface of said end bracket, a plurality of heat radiating fins on the exterior surface of said end bracket, said fins projecting outwardly beyond the adjacent edges of said fan blades, each of said fins being an arc of a circle concentric with said shaft, said fins being arranged in circumferentially aligned rows and radially aligned columns, and notches on the edges of said blades adjacent said fins positioned to receive said fins when said fan is rotating.

8. In a fan cooled dynamoelectric machine; a self-cleaning ventilating system comprising an end bracket having a central opening, a rotatable shaft extending through said central opening, a fan having a plurality of blades secured to said shaft exteriorly of said end bracket and rotatable with said shaft, each of said blades having an edge lying in close proximity to the exterior surface of said end bracket, a plurality of heat radiating fins on the exterior surface of said end bracket, said fins projecting outwardly beyond the adjacent edges of said fan blades, each of said fins being an arc of a circle concentric with said shaft, said fins being arranged in circumferentially aligned rows and radially aligned columns, some of said rows having their fins circumferentially displaced from the fins in other of said rows, and notches on the edges of said blades adjacent said fins positioned to receive said fins when said fan is rotating.

9. In a fan cooled dynamoelectric machine; a self-cleaning ventilating system comprising an end bracket having a central opening, a rotatable shaft extending through said central opening, a fan having a plurality of blades secured to said shaft exteriorly of said end bracket and rotatable with said shaft, each of said blades having an edge lying in close proximity to the exterior surface of said end bracket, a plurality of heat radiating fins on the exterior surface of said end bracket, said fins projecting outwardly beyond the adjacent edges of said fan blades, each of said fins being an arc of a circle concentric with said shaft, said fins being arranged in circumferentially aligned rows and radially aligned columns, alternate rows having their fins circumferentially displaced from the next adjacent row and notches on the edges of said blades adjacent said fins positioned to receive said fins when said fan is rotating.

10. In a fan cooled dynamoelectric machine; a self-cleaning ventilating system comprising an end bracket having a central opening, a rotatable shaft extending through said central opening, a fan having a plurality of blades secured to said shaft exteriorly of said end bracket and rotatable with said shaft, each of said blades having an edge lying in close proximity to the exterior surface of said end bracket, a plurality of heat radiating fins on the exterior surface of said end bracket, said fins projecting outwardly beyond the adjacent edges of said fan blades, each of said fins being an arc of a circle concentric with said shaft, said fins being arranged in circumferentially aligned rows and radially aligned columns, fins of alternate rows being arranged to span the distance between fins of adjacent rows and notches on the edges of said blades adjacent said fins positioned to receive said fins when said fan is rotating.

References Cited in the file of this patent

UNITED STATES PATENTS

| | | |
|---|---|---|
| 2,707,244 | Kilgore | Apr. 26, 1955 |
| 2,778,958 | Hamm | Jan. 22, 1957 |

FOREIGN PATENTS

| | | |
|---|---|---|
| 616,902 | Germany | Aug. 8, 1935 |